United States Patent
So

(10) Patent No.: US 6,938,769 B2
(45) Date of Patent: Sep. 6, 2005

(54) DISC CASE

(76) Inventor: Shintaro So, 4-14-9, Wakabayashi, Setagaya-ku, Tokyo (JP)

( * ) Notice: Subject to any disclaimer, the term of this patent is extended or adjusted under 35 U.S.C. 154(b) by 0 days.

(21) Appl. No.: 10/189,569

(22) Filed: Jul. 8, 2002

(65) Prior Publication Data

US 2003/0006152 A1 Jan. 9, 2003

(30) Foreign Application Priority Data

Jul. 9, 2001 (JP) .................................. 2001-244947

(51) Int. Cl.⁷ .............................................. B65D 85/57
(52) U.S. Cl. ..................... 206/472; 206/308.1; 206/312
(58) Field of Search ............................ 206/307, 308.1, 206/311–313, 472; 211/40, 41.12; 281/29, 38

(56) References Cited

U.S. PATENT DOCUMENTS

| | | | | |
|---|---|---|---|---|
| 5,186,327 A | * | 2/1993 | McCafferty et al. | 206/308.1 |
| 5,460,265 A | * | 10/1995 | Kiolbasa | 206/308.1 |
| 5,772,018 A | * | 6/1998 | Walch | 206/308.1 |
| 5,772,019 A | * | 6/1998 | Reed | 206/308.1 |
| 6,044,969 A | * | 4/2000 | Denize et al. | 206/308.1 |
| 2002/0134694 A1 | * | 9/2002 | Cherng | 206/308.1 |

FOREIGN PATENT DOCUMENTS

| | | |
|---|---|---|
| JP | 2-8792 U | 1/1990 |
| JP | 10-147090 | 6/1998 |
| JP | 11-139481 | 5/1999 |
| JP | 11-301764 | 11/1999 |
| JP | 11-314693 | 11/1999 |
| JP | 11-349080 | 12/1999 |
| JP | 2000-79978 | 3/2000 |
| JP | 2001-19076 | 1/2001 |

OTHER PUBLICATIONS

Translation of the Notice of JP Office Action.

* cited by examiner

Primary Examiner—Jim Foster
(74) Attorney, Agent, or Firm—Westerman, Hattori, Daniels & Adrian, LLP

(57) ABSTRACT

The present invention relates to a disc case 1, which alternates conventional disc cases made of a plastic resin. The disc case 1 is capable of housing a disc body 100 having a periphery with a radius R100. The disc case 1 comprises a base layer 41 extending to a cover layer 43 via a crease 42, the base layer 41 with the cover layer 43 being foldable in two at the crease 42; a first layer 11 provided above the base layer 41, the first layer 11 having a first opening 12 formed in a circle corresponding to the periphery of the disc body; a second layer 21 provided on the first layer 11, the second layer 21 having a second opening 22 formed in a partial circle in a size to pass the disc body, and covering a part of the first opening 12; and a third layer 31 provided between the base layer 41 and the first layer 11, the third layer 31 having an third opening whose periphery supports the periphery of the disc body. The disc body is capable of inserted from the second opening 22 and fitted in the first opening 12. The cover layer 43 is folded to cover the upper surface of the second layer 21.

18 Claims, 4 Drawing Sheets

DISC CASE

TECHNICAL FIELD OF THE INVENTION

This invention relates to a disc case capable of housing a disc, such as a compact disc read only memory (CD-ROM), compact disc recordable (CD-R), compact disc rewritable (CD-RW) or digital video disc (DVD).

THE BACKGROUND OF THE INVENTION

Conventionally, a disc such as a compact disc read only memory (CD-ROM), compact disc recordable (CD-R), compact disc rewritable (CD-RW) or digital video disc (DVD) is generally housed in a plastic disc case. Such a disc has a body generally shaped in a circle with a radius. The disc body has a recording surface and a central opening in the center of the disc body. On the other hand, the conventional disc case has a body having a recessed portion for housing the disc body, the recessed portion has a central portion for holding the disc body. The disc body is housed in the disc case with the central opening of the disc body being engaged with the central portion of the disc case.

However, recording on a disc generally starts from a portion closer to the central opening on the recording surface, such that the portion closer to the central opening of the disc body should be protected more carefully than the conventional art. Also, the conventional disc case sometimes holds the disc body at the central opening so tightly that a user may have difficulty in releasing it. Further, it is necessary to develop a disc case made of a material other than a synthetic resin, which causes less environmental pollution. Furthermore, it is necessary to develop a disc case for protecting the recording surface more carefully than the conventional art. Also, it is preferable to increase the capacity of the memory of the disc body.

The disc case according to the present invention was developed in consideration of the above objectives.

SUMMARY OF THE INVENTION

According to the present invention, there is provided a disc case, capable of housing a disc body, having a periphery with a radius comprising a base layer; a first layer provided above the base layer, the first layer having a first opening corresponding to the periphery of the disc body; a second layer provided on the first layer, the second layer having a second opening with a size to pass the disc body, and the second layer covering a part of the first opening. The disc body is capable of being inserted from the second opening for being housed in the first opening.

Also, according to the present invention, the base layer extends to a cover layer via a crease in such a manner that the cover layer is folded to cover the upper surface of the second layer.

Also, according to the present invention, the first opening may be formed in a circle having a first radius corresponding to the radius of the disc body. The second opening may be formed in a partial circle having a second radius corresponding to the radius of the disc body.

Further, the disc case may comprise a third layer provided between the base layer and the first layer, the third layer having an third opening whose periphery supports the periphery of the disc body when the disc body is housed inside the first opening.

According to the present invention, the disc case is preferably made of paper. The cover layer is composed of at least two sheets of paper layered. The base layer is composed of at least two sheets of paper layered one above another.

BRIEF DESCRIPTION OF THE DRAWINGS

FIG. 4(a) shows a plan view thereof and FIG. 4(b) shows a cross-sectional view at a line A–A' of FIG. 4(a).

DETAILED DESCRIPTION

The following description is considered to be the best mode contemplated by the inventor to carry out the present invention, but the present invention is not limited to the following description and a person in the art may modify the present invention within the scope defined by the claims.

Figure 1:
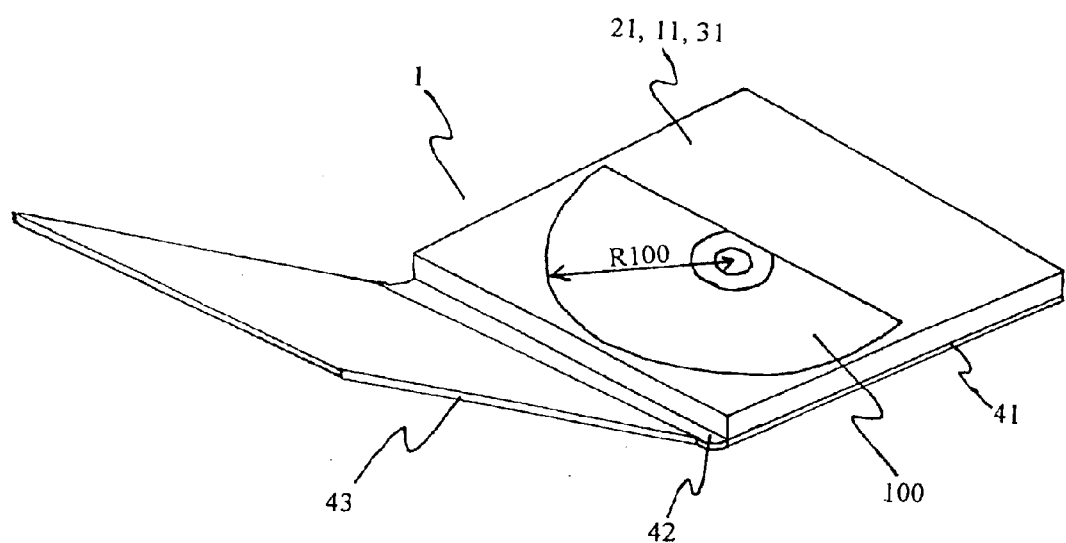
FIG. 1 shows a perspective view of a disc case according to the present invention, in a condition that a disc body is housed therein.
Figure 2:
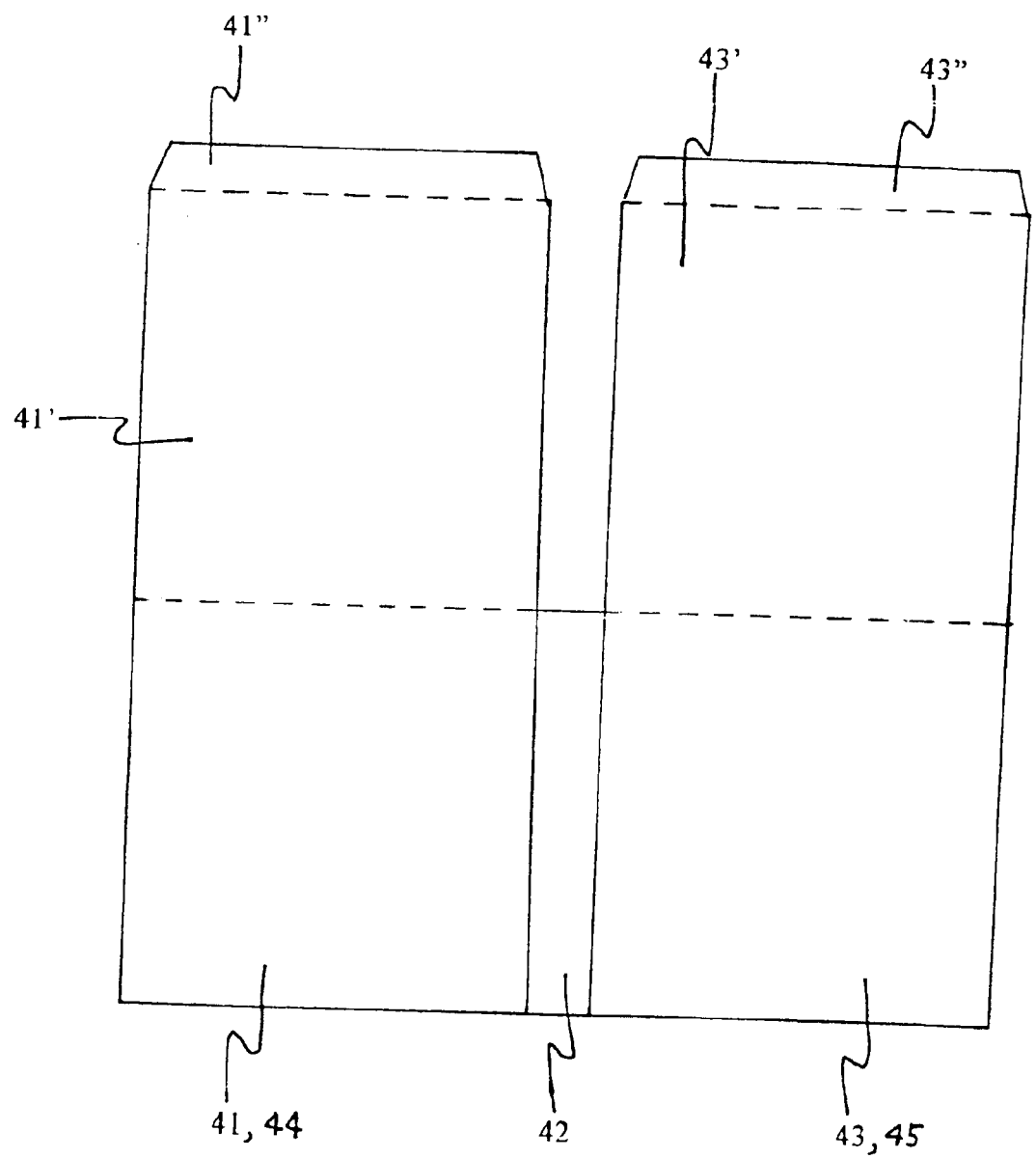
FIG. 2 shows a dismantling plan view of the base layer of the disc case shown in FIG. 1.
Figure 3:
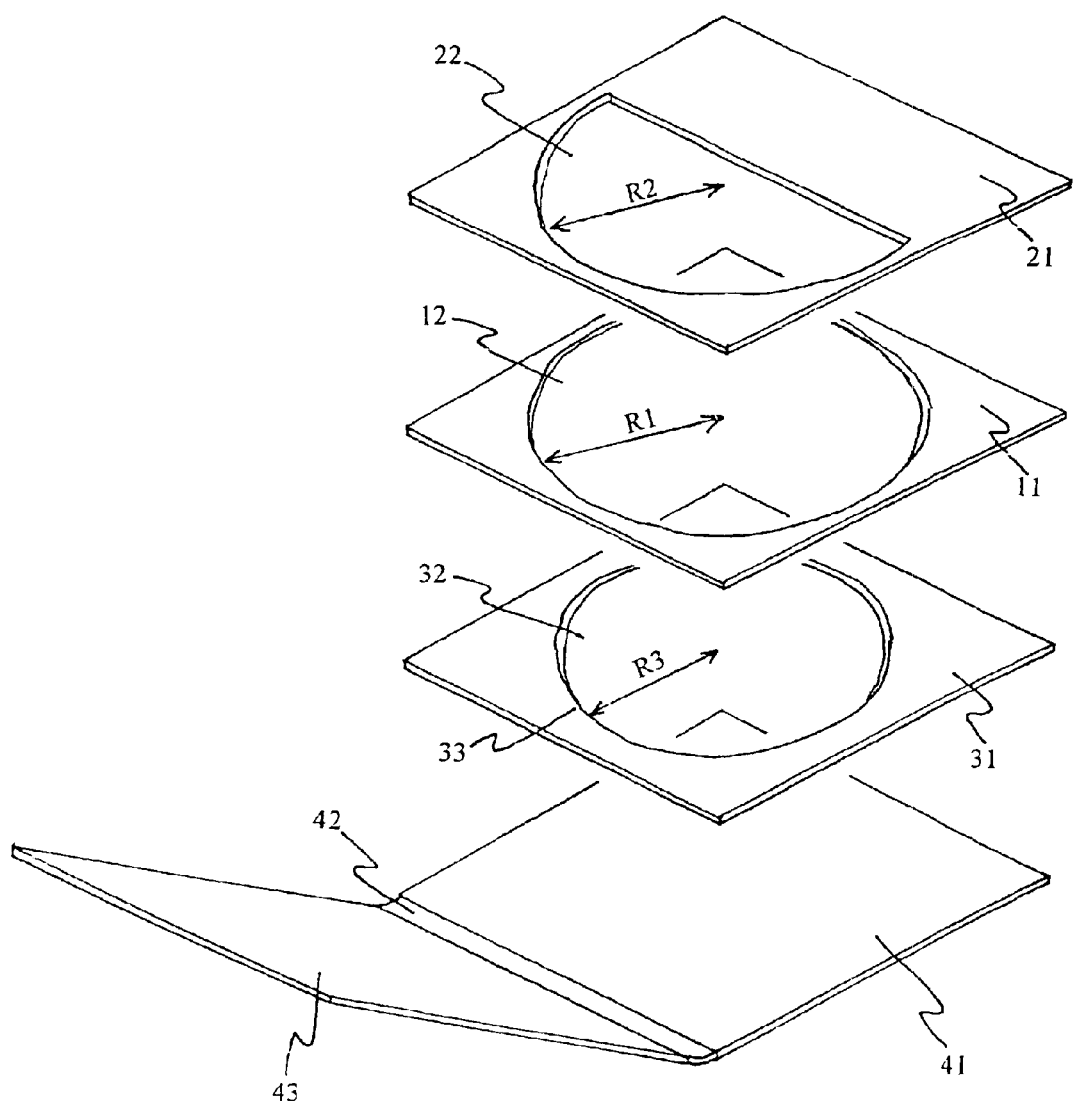
FIG. 3 shows a dismantling view of the disc case shown in FIG. 1.
Figure 4:
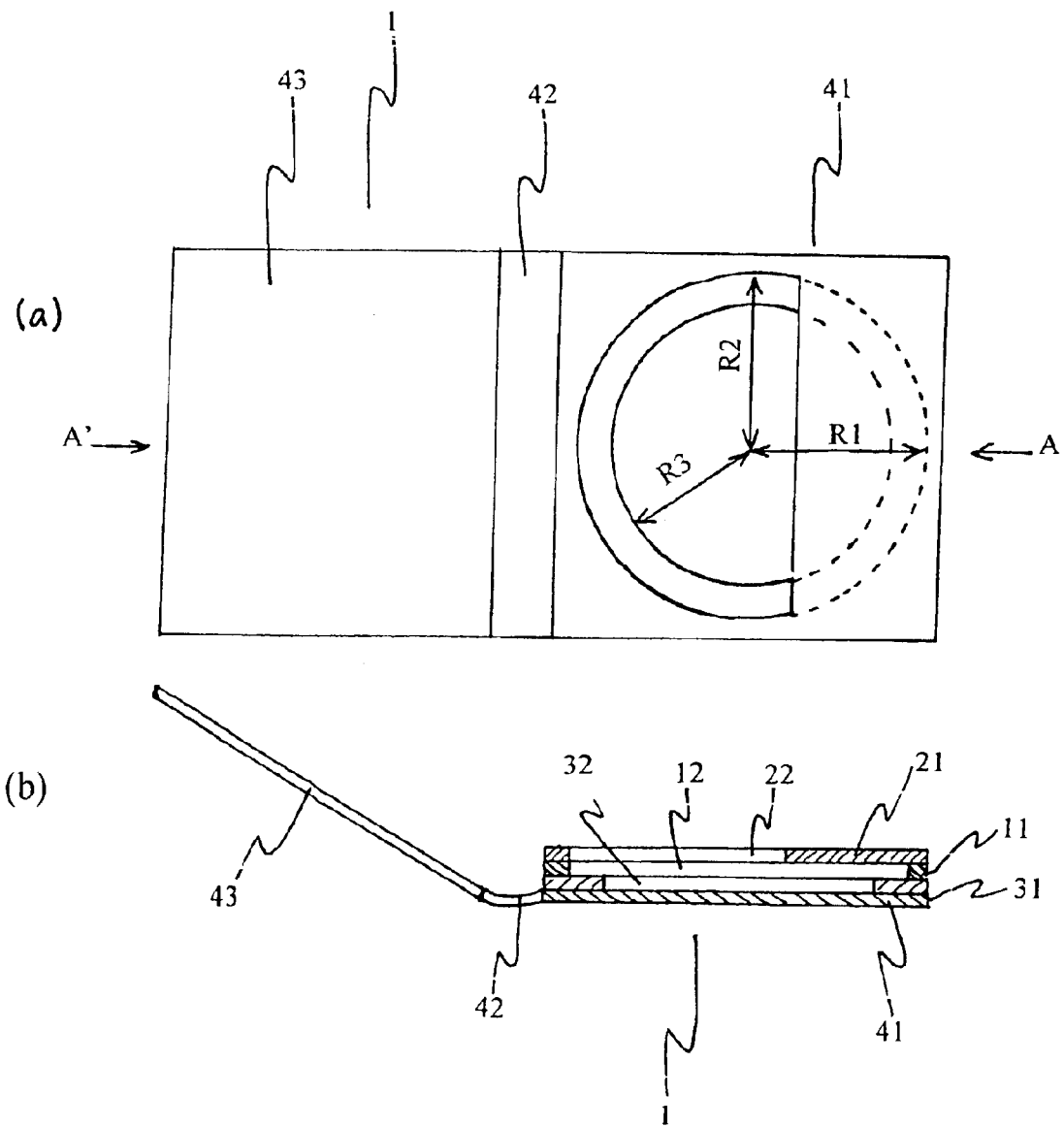
FIG. 4 shows the disc case shown in FIG. 1.

FIG. 1 shows a perspective view of a disc case as an embodiment of the present invention. The disc case is designed to house a disc having a body having a periphery with a radius. The disc body has a radius of 60.5 mm, approximately. FIG. 2 shows a dismantling plan view of the base layer of the disc case shown in FIG. 1. FIG. 3 shows a dismantling view of the disc case shown in FIG. 1. FIG. 4 shows the disc case shown in FIG. 1, and FIG. 4(a) shows a plan view thereof and FIG. 4(b) shows a cross-sectional view at a line A–A' of FIG. 4(a).

In the case of the embodiment shown in the Figures, the disc case has a base layer 41 extending to a cover layer 43 via a crease 42. As shown in FIG. 3, a third layer 31 is provided to layer on the base layer 41, and a first layer 11 is provided to layer on the third layer 31, and a second layer 21 is provided to layer on the first layer 11. The layers 41, 31, 11 and 21 are attached by using glue, two-sided tape, and so on.

The layers are made of paper. Therefore, the present invention causes less environmental pollution than the conventional disc case made of a plastic resin such that the present invention may contribute to environmental protection. Each paper sheet of the embodiment has a thickness of 0.8 mm, but not to be limited thereto, and the paper preferably a thickness of 0.3 to 1.5 mm, more particularly of 0.6 to 1.0 mm, and most particularly of 0.7 to 0.9 mm, according to the present invention.

The layers 41, 11, 21 and 31 may be variously shaped, but are preferably shaped in a rectangle, and more preferably in a square as shown as the embodiment. As to the embodiment, each of the layers has a side having a length of 140 mm, approximately.

According to the present invention, the first layer 11 has a first opening 12 having a first radius R1 corresponding to the radius of the disc body R100. The first radius R1 shown is 60.5 mm, approximately. The first opening 12 is formed in a circle, but is not limited thereto. Other than the circle shape, the first opening 11 may be any shape, such as a rectangle, square, triangle, diamond, pentagon, hexagon, heptagon, octagon, heart, and so on, so long as the first opening 11 is opened to engage with the periphery of the disc body 100 so as to house the disc body inside the first opening 11.

Also, the second layer 21 has a second opening 22 of a partial circle having a second radius R2 corresponding to the radius R100 of the disc body 100. The second layer 21 partially covers the first opening 12 of the first layer 11 so as to engage and hold the disc body when the disc body is housed inside the first opening 12. While the second radius R2 shown is 60.5 mm, approximately, same as the size of the first radius R1, the second opening 22 is designed to open in such a manner that the second opening may be opened to have a size to pass the disc body and the second layer covering a part of the first opening 12. Through the second opening 22, the disc body is inserted into the first opening 12 for housing. The second opening 22 is opened to have a semi-circle or half circle, or to have a major arc, for easily inserting and taking out the disc body from the second opening 22 as well as stably engaging the disc body inside the first opening 12. The size of the arc of the second opening 22 may be varied, but the arc preferably has a central angle of 180 to 250°.

The area where the second layer 21 covers the first opening 12 of the first layer 11 is not limited according to the present invention, but the area may be 10 to 50%, and more preferably 30 to 48%, and most preferably 35 to 45%, so as to stably hold the disc body housed in the first opening by the covering second layer 21. As to the embodiment, the area where the second layer 21 covers the first opening 12 is approximately 40%, or in other words, the disc body 100 is covered by 40% by the second layer 21.

The second opening 22 is formed in a partial circle as shown in the Figures, but is not limited thereto. Other than the partial-circle-shaped second opening 22, the second opening 22 may be shaped in, for example, a part of rectangle, square, triangle, diamond, pentagon, hexagon, heptagon, octagon, heart and so on, so long as the disc body 100 may be passed through the second opening 22 to be housed inside the first opening 11.

The second opening is located at the closer side of the crease 42. In case of the second opening 22 being opened in a partial circle as shown in the Figures, the arc of the second opening 22 is opposed to the crease 42. Therefore, the disc body is avoided from inadvertently falling out of the first opening 12 during storing or delivering.

According to the present invention, the disc case 1 is optionally provided with a third layer 31 having a third opening 32. The third opening 32 of the third layer 31 is shaped in a circle having a third radius R3, which is slightly less than the first radius R1 of the first opening 11 or the radius R100 of the disc body, so that the periphery 33 of the third opening 32 may support the periphery of the disc body 100. The third radius R3 is 57 mm, approximately. When a disc body 100 is housed in the first opening 12 in such a manner that the recording surface of the disc faces the upper surface of the base layer 41, there may be a gap between the recording surface of the housed disc body 100 and upper surface of the base layer 41, so that the disc body 100 may be prevented from being scratched on the recording surface thereof. As for the third opening 32 being circular, the third radius R3 of the third opening 32 may be 1 to 10%, or more preferably, 2 to 8% less than the first radius R1 of the first opening 12.

The shape of the third opening is not limited to being circular. Other than the circle shape, the third opening 32 may be shaped in, for example, a rectangle, square, triangle, diamond, pentagon, hexagon, heptagon, octagon, heart, and so on, so long as the periphery of the recording surface of the disc body 100 is supported by the periphery 33 of the third opening 32 to form a gap between the recording surface and the base layer to prevent the recording surface from being scratched. In case of the embodiment, the gap corresponds to the third opening, but is not to be limited thereto.

FIG. 2 shows a dismantling plan view of the base layer 41 extending to a cover layer 43 via a crease 42. The base layer 41 is composed of two sheets of paper 44 and 41' with a glued portion 41", and the cover layer 43 is composed of two sheets of paper 45 and 43' with a glued portion 43". After one of the surfaces of the glued portion 41" is provided with glue, sheet 41' is folded at the shown dashed line to layer on the sheet 44 and the glued portion 41" is attached to the sheet 44 to prepare the base layer 41. Similarly, cover layer 43 is prepared. Before assembling the base layer and the cover layer, printing, if necessary, may be finished for efficiency. Since the cover and base layers are composed of two sheets of paper, the disc case protects the disc housed therein by absorbing shock. The base layer 41 with the cover layer 43 can be folded in two at the crease 42 in two.

While the disc body 100 housed in the disc case 1 shown in FIG. 1 has a central opening 101, it is not necessary to provide the disc body 100 with the central opening. Therefore, the disc body with the central opening 101 of the present invention may be eliminated so as to alternatively utilize such portion to increase the disc capacity of memory.

As described above, the present invention is described based on a single disc case for housing one disc on a disc case. However, the person in the art may modify the present invention to house two, three or four discs, or more, in a disc case.

What is claimed is:

1. A case in combination with a disc to be housed in said case, comprising:
   a disc body having a periphery with a radius;
   a base layer;
   a first layer provided above the base layer, the first layer having a first opening corresponding to the periphery of the disc body;
   a second layer provided on the first layer, the second layer having a second opening having a size to pass the disc body, and covering a part of the first opening; and
   a third layer provided between the base layer and the first layer, the third layer having a third opening whose periphery supports the periphery of the disc body;
   wherein the disc body is inserted from the second opening for being housed in the first opening.

2. A case in combination with a disc to be housed in said case, according to claim 1 wherein the base layer extends to a cover layer via a crease in such a manner that the cover layer is folded at the crease to cover the upper surface of the second layer.

3. A case in combination with a disc to be housed in said case according to claim 1 wherein the first opening is circularly opened.

4. A case in combination wish a disc to be housed in said case according to claim 1 wherein the second opening is formed in a partial circle.

5. A case in combination with a disc to be housed in said case according to claim 4 wherein the partial circle has a second radius corresponding to the radius of the disc body.

6. A case in combination with a disc to be housed in said case according to claim 1 wherein the third opening is smaller than the first opening.

7. A case in combination with a disc to be housed in said case according to claim 1 wherein the disc case is made of paper.

8. A case in combination with a disc to be housed in said case according to claim 2 wherein the cover layer is composed of at least two sheets of paper layered one above another.

9. A case in combination with a disc to be housed in said case according to claim 7 wherein the base layer is composed of at least two sheets of paper layered one above another.

10. A case in combination with a disc to be housed in said case, comprising:
- a disc body having a periphery with a radius;
- a base layer extending to a cover layer via a crease, the base layer with the cover layer being foldable at the crease in two;
- a first layer provided above the base layer, the first layer having a first opening corresponding to the periphery of the disc body; and
- a second layer provided on the first layer, the second layer having a second opening having a size to pass the disc body, and covering with a part of the first opening; and
- a third layer provided between the base layer and the first layer, the third layer having a third opening whose periphery supports the periphery of the disc body, wherein the third opening is smaller than the first opening;
- wherein the disc body is inserted from the second opening and engaged with the first opening, and wherein the cover layer is folded at the crease to cover the upper surface of the second layer.

11. A case in combination with a disc to be housed in said case according to claim 10 wherein the first opening is circularly opened to have a first radius corresponding to the radius of the disc body.

12. A case in combination with a disc to be housed in said case according to claim 10 wherein the second opening is formed in a partial circle.

13. A case in combination with a disc to be housed in said case according to claim 12 wherein the arc of the partial circle of the second opening is provided opposing to the crease.

14. A case in combination with a disc to be housed in said case according to claim 12 wherein the partial circle of the second opening has a central angle of 180 to 250°.

15. A case in combination with a disc to be housed in said case according to claim 10 wherein the third opening is circularly opened to have a third radius slightly less than the first radius of the first opening.

16. A case in combination with a disc to be housed in said case according to claim 10 wherein a gap is formed between the base layer and a surface of the disc body housed inside the first opening.

17. A case in combination with a disc to be housed in said case according to claim 10 wherein the area of the second layer covering the first opening is 10 to 50%.

18. A case in combination with a disc to be housed in said case comprising:
- a disc body having a periphery with a radius;
- a base layer extending to a cover layer via a crease, the base layer with the cover layer being foldable in two at the crease;
- a first layer provided above the base layer, the first layer having a first opening circularly opened to correspond to the periphery of the disc body;
- a second layer provided on the first layer, the second layer having a second opening partial-circularly opened to have a size to pass the disc body, and covering a part of the first opening; and
- a third layer provided between the base layer and the first layer, the third layer having a third opening circularly opened slightly less than the periphery of the disc body;
- wherein the disc body is inserted from the second opening and fitted in the first opening, and wherein the cover layer is folded to cover the upper surface of the second layer, and
- wherein the second layer covers the first opening at an area of 10 to 50% of the first opening.

* * * * *